United States Patent [19]
Nobusawa

[11] 3,765,311
[45] Oct. 16, 1973

[54] INFORMATION CONVERTER
[75] Inventor: Tsukumo Nobusawa, Tokyo, Japan
[73] Assignee: Asahi Kogaku Kogyo Kabushiki Kaisha, Tokyo-to, Japan
[22] Filed: Apr. 10, 1972
[21] Appl. No.: 242,668

[30] Foreign Application Priority Data
Apr. 20, 1971 Japan.............................. 46/24932
May 17, 1971 Japan.............................. 46/32449
May 22, 1971 Japan.............................. 46/34983
Apr. 20, 1971 Japan.............................. 46/24931

[52] U.S. Cl. ............................................. 95/10 CT
[51] Int. Cl. ............................................ G03b 7/08
[58] Field of Search .................... 95/10 CE, 10 CT; 320/1; 340/347 AD

[56] References Cited
UNITED STATES PATENTS
3,251,052 5/1966 Hoffman et al..................... 340/347
3,603,799 9/1971 Nobusawa........................... 250/214
3,633,473 1/1972 Yashuhiro............................ 95/10
3,651,744 3/1972 Okada.................................. 95/10

Primary Examiner—Samuel S. Matthews
Assistant Examiner—Michael L. Gellner
Attorney—Harold D. Steinberg et al.

[57] ABSTRACT

An information converter for converting analog-information not only into a digital value but also into a fractional analog value between digital values. An input capacitor stores an analog-information charge. An input is electrically connected with this input capacitor for charging the latter to an extent determined by the analog information. An output capacitor is provided with a capacitance less than that of the input capacitor. An oscillating circuit is electrically connected with both of the capacitors for carrying out a number of charge-discharge cycles during which the output capacitor is charged from the analog-information charge of the input capacitor up to a predetermined digital-value charge, then discharged, then charged again, and so on, until, in the event that the analog-information charge is not a precise multiple of the digital-value charge, both of the capacitors assume a balanced condition where they respectively have equal residual analog charges each of which is less than the digital-value charge. A detecting circuit is electrically connected with at least one of the capacitors for detecting the residual analog charge.

15 Claims, 10 Drawing Figures

INFORMATION CONVERTER

BACKGROUND OF THE INVENTION

The present invention relates to information converters.

Thus, the present invention relates to that type of information converter which is capable of presenting information in the form of an electrical quantity, for example, and which can then operate on this electrical quantity so as to bring about automatic controls. Thus, the present invention may be used in connection with light at an object to be photographed, this light being detected so as to form analog information which can be presented in the form of an electrical quantity, and then this latter quantity can be operated upon to control a light meter, for example, giving to the operator an indication of the light value, or this quantity may be operated upon to bring about automatic controls of the shutter of a camera, for example. It is to be understood, however, that these are only examples of the manner in which the invention can be put to practical use and that other practical uses are equally available for the present invention.

In the case of cameras, it is well known to provide automatic shutter controls capable of automatically determining the exposure time and automatically operating the shutter accordingly. Conventional controls of this type utilize, for example, an internal light-receiving system which receives light which has already travelled through the objective of the camera. In the past few years it has become customary in certain types of cameras to select, in accordance with the light received by the internal system, a given timing resistor so that the exposure time will be controlled according to that one of a number of timing resistors which is automatically selected. However, this type of control has inherent disadvantages. The selection of one of a series of timing resistors necessitates a stepped adjustment of the exposure time. Thus, such structures can only provide exposure times which have predetermined increments from one to the next, and it is not possible to achieve a continuous adjustment of exposure time. Since it seldom happens that the light at the oject to be photographed and the other factors such as film speed and diaphragm aperture will be precisely represented by a given timing resistor, there is an inherent inaccuracy in this type of structure, and highly precise exposure times cannot be achieved because of the stepped type of selection which is necessitated by this type of structure.

Thus, with conventional structure of the above type, and these structures include not only light meters and cameras, but also other types of devices such as communication apparatus, for example, the limitation of the controls to stepped or incremental values represents a serious disadvantage since values between the incremental values must be neglected.

SUMMARY OF THE INVENTION

It is therefore a primary object of the present invention to provide an information converter which will avoid the above drawbacks.

Thus, it is an object of the present invention to provide an information converter which can operate effectively to provide a control not only according to stepped values but also according to values between the stepped values so as to achieve a truly continuous control.

A further object of the present invention is to provide a structure which can achieve these results by making use of relatively simple circuitry and components which operate very reliably.

In addition it is an object of the present invention to provide the possibility of achieving the desired results simply by adding to conventional structure a structure which will give values between the incremental values which can be obtained in a conventional manner.

The objects of the present invention also include the provision of a structure which will operate in a fully automatic manner to achieve the above results, without requiring any special manipulations by the operator, so that as far as an operator is concerned although a device may include the structure of the invention, it is not necessary for the operator to learn new procedures.

Thus, the present invention relates to an information converter of the type where analog information, such as analog information determined electrically from light received from an object which is to be photographed, is converted into a series of digital quantities of equal predetermined magnitudes, with the converter also providing an additional residual analog quantity which is less than a digital quantity.

Therefore, the primary purpose of the invention is to convert electrically converted information such as information according to light received from an object to be photographed or any other convenient analog information into a series of additional quantities and a residual analog quantity which may be regarded as a remaining fractional value for use in the control of a camera shutter, an exposure meter, or any other apparatus or instrument.

According to the invention the information converter includes an input capacitor means for storing an analog-information charge. An input means is electrically connected with the input capacitor means for charging the latter to an extent determined by the analog information. An output capacitor means has a capacitance less than the input capacitor means. An oscillating circuit means is electrically connected with both of the capacitor means for carrying out a number of charge-discharge cycles during which the output capacitor means is charged from the analog-information charge stored by the input capacitor means up to a predetermined digital-value charge, then discharged, then again charged from the input capacitor means up to the digital-value charge, and so on, until, in the event that the analog-information charge is not a precise multiple of the digital-value charge, both of the capacitor means assume a balanced condition where they respectively have equal residual analog charges each of which is less than the digital-value charge. A detecting means is electrically connected with at least one of the capacitor means for detecting this residual analog charge.

By incorporating the structure of the invention into a timing resistor selecting type of electric shutter control, with the analog-information being provided by photoelectrically converting light from the object to be photographed into the form of a charge stored by an input capacitor means, it is possible to discharge the latter during a number of cycles by a suitable oscillating circuit means through an output capacitor means which can be repeatedly charged up to a predetermined digital-value charge corresponding to light equal to 1 L.V. (light value). It is possible to achieve a continuous adjustment of exposure time with the residual analog charge being less than 1 L.V. Thus when the actual intensity of light corresponds to a value between two adjacent exposure time graduations which are graduated in accordance with given multiples, the trigger voltage of the electric shutter control circuit can also be controlled with the information converter of the invention in accordance with the residual analog charge which remains when both of the capacitor means are in their balanced condition, so that a continuous adjustment of exposure time can be achieved. However, because of the characteristics which are associated with charging and discharging operations of a pair of capacitors which are included in the information converter of the invention, a certain bias resistor will be required in the trigger circuit of the electric shutter controls.

Although the invention is described above in connection with shutter controls of a camera, it is equally possible to incorporate the invention into an electric exposure meter by the use of suitable circuits. In this case if the photoelectrically converted information from the light of the object to be photographed is used as the input analog information, there will appear across the terminals of the output capacitor means a series of digital charges and a final residual analog charge with the total of the digital-value charges plus the residual analog charge corresponding precisely to the intensity of the light which is to be measured. Thus such a meter may be provided with an indicator means which will indicate each L.V. in a stepped manner, corresponding to the number of digital-value charges or in other words to the number of cycles that the output capacitor means is charged and discharged, while a second indicator may be incorporated into the light meter to provide a fractional indication of a light value between adjacent whole light values, so that in this way such a meter can provide a continuous indication of accurate exposure time.

As is apparent from the above, in the description which follows the expression "digital information" signifies the terminal voltage up to which the output capacitor means is charged just before the moment when it is discharged, this terminal voltage being a predetermined constant voltage level. The residual analog charge signifies the terminal voltage at either of the capacitors at the time when these terminal voltages become equal to each other and have a value less than the digital-value charge.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
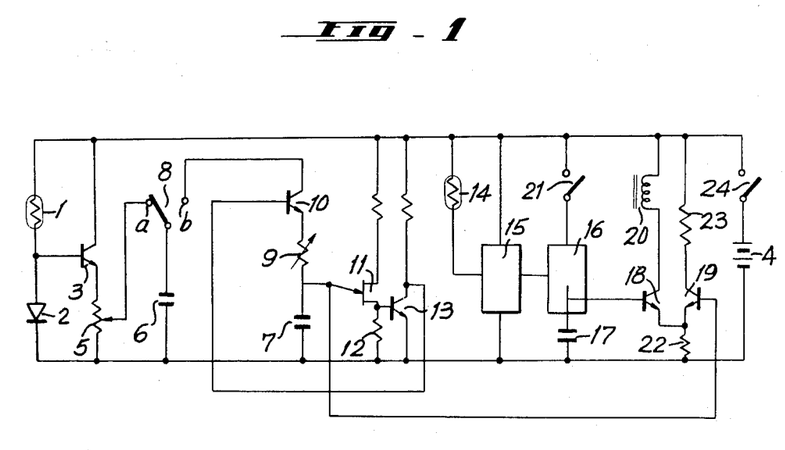
FIG. 1 is a wiring diagram of one embodiment of the invention.

Referring now to FIG. 1, the information converter of the invention which is illustrated therein is shown as applied to a camera for controlling a shutter which has a timing resistor selection type of control system. The illustrated information converter includes an input capacitor means 6 for storing an analog-information charge. This input capacitor means 6 is electrically connected with an input means which charges the capacitor means 6 to an extent determined by the analog information. The input means includes a photosensitive light-receiving element 1 which receives light from the object which is to be photographed. This photosensitive means 1 converts the received light into a corresponding electrical quantity. The light-receiving element 1 is electrically connected in series with a logarithmic conversion diode 2. The circuit includes a power source 4, formed by one or more batteries, for example, and this power source 4 is connected in series with a transistor 3 of the input means. The light-receiving element 1 is connected across the base and collector terminals of transistor 3 while the logarithmic conversion diode is connected across the base and emitter terminals, so that these components form an input means in the form of a photographic conversion circuit of the information converter of the invention.

The emitter circuit of the transistor 3 includes a variable resistor 5, and the input capacitor means 6 is connected in parallel with the variable resistor 5.

The information converter of the invention includes an output capacitor means 7 which has a capacitance less than that of the input capacitor means 6. The capacitor means 6 and the capacitor means 7 are electrically connected to each other through a selecting switch 8 which is normally in the position shown in FIG. 1 where the switch 8 is closed at its contact $a$, thus maintaining the capacitor means 6 electrically connected with the variable resistor 5 and the other components 1-3 of the input means. The switch 8 has a normally open contact $b$. Thus, during normal operation the analog information in the form of the light at the object to be photographed is stored by the input capacitor means 6 in the form of an analog-information charge. Just prior to exposure of film, in response to depression of a shutter-tripping plunger of the camera, the switch 8 will be operated so as to become open at its contact $a$ and closed at its contact $b$, this operation of the switch 8 taking place in a well known manner. Therefore, after the analog-information has been stored in the form of a charge at the input capacitor means 6, the switch 8 is actuated to disconnect the capacitor means 6 from the input means and instead connect it electrically to the output capacitor means 7. As a result, when the switch 8 is closed at its contact $b$ the capacitor means 6 discharges in order to charge the capacitor means 7 which is inserted into the discharge circuit of capacitor means 6 by the above operation of the switch 8. This discharge circuit for the input capacitor means 6 includes a variable resistor 9 which is capable of adjusting the charging time of the output capacitor means 7. Also the discharge circuit includes a switching transistor 10 which operates to temporarily open the discharge circuit of the input capacitor means 6, this opening of the discharge circuit by the transistor 10 taking place simultaneously with discharge of the output capacitor means 7 after the latter has been charged up to a predetermined potential corresponding to a digital-value charge. Thus, the transistor 10 forms part of an oscillating circuit means which enables the output capacitor means 7 to be charged up to a predetermined digital-value charge, then discharged, and then when the disconnection of capacitor 6 from capacitor 7 is terminated by the transistor 10 the capacitor 7 can again be charged up to the predetermined digital value charge, so that in this way the oscillating circuit brings about repeated charge-discharge cycles at the output capacitor means 7.

The oscillator circuit means of FIG. 1 also includes a UJT (uni-junction transistor) 11 connected at its emitter to the positive terminal of the output capacitor means 7 while the UJT 11 is coupled at one of its base terminals to an output resistor 12 and to the base of a switching transistor 13 of the oscillating circuit means. The collector of switching transistor 13 and the base of the first switching transistor 10 which cyclically opens the discharge circuit of capacitor 6 are electrically connected to each other so as to form in this way an electric feedback circuit.

In FIG. 1 the components 14-24 are electrically connected to form a circuit according to which the exposure time is incrementally controlled in steps by automatic selection of a timing resistor. This part of the circuit includes a light-receiving element 14, a selection circuit 15 connected thereto for transmitting a selection signal according to which a given timing resistor will be selected, a timing resistor-selecting circuit 16 electrically connected to the selection-signal circuit 15 and including a plurality of timing resistors, a timing capacitor 17, transistors 18 and 19 which form a voltage-comparing circuit, an electromagnet 20 which determines in a known way when the exposure will be terminated, a switch 21 for starting operation of the shutter, this switch operating in response to depression of the shutter-operating plunger of the camera, a trigger resistor 22 capable of developing a trigger voltage, a bias resistor 23 for biasing the trigger circuit, and the power source switch 24.

The above structure of FIG. 1 is capable of achieving a continuous exposure-time adjustment. For the purpose of describing the operation, it may be assumed as an example that the condition of the light at the object to be photographed is such that the light has a light value (L.V.) which is equal to 12.4.

Under these conditions where the shutter controls are not provided with the information converter of the invention, the circuit 15 will automatically transmit to the circuit 16 a signal which will select at the circuit 16 a timing resistor corresponding to L.V. = 12.0. Therefore, the exposure time will be determined by the time constant which in turn is determined by the selected timing resistor and the timing capacitor 17. As a result the residual L.V. of 0.4 cannot be used for control of the exposure time and will instead be neglected as an inevitable error inherent with a structure of this type. In contrast, however, with the present invention it is capable of picking up this residual L.V. = 0.4 as a residual analog charge by utilizing the information converter of the invention, and this residual analog charge can be used to control the trigger voltage of the shutter controls.

Thus, referring to FIG. 1 when the switch 24 is closed both of the light-receiving elements 1 and 14 will respond to light at the object to be photographed. At this time the timing resistor selection-signal circuit 15 produces a timing resistor selection signal in response to the light at the object to be photographed so as to thereby bring about an automatic selection of a timing resistor in the circuit 16, and now the switch 21 is closed, for example in response to selection of a resistor at the circuit 16, so that the shutter opens in order to start an exposure. However, in the particular example used for illustration the selected timing resistor will correspond only to L.V. = 12.0, and not to L.V. = 12.4, which is assumed to be the actual precise condition of the light at the object which is to be photographed. information However, with the invormation converter of the invention simultaneously with the travel of light to the element 14 the light has also been received by the element 1, and the information converter of the invention has been set into operation upon closing of the switch 24, so that the input means formed by components 1, 2, 3, 5 operates to store at the input capacitor means 6 an analog-information charge corresponding to the condition of the light at the object to be photographed. This of course takes place at this time through the contact $a$ of the selecting switch 8. As has been pointed out above, just prior to opening of the shutter the selecting switch 8 is automatically displaced to open the circuit at the contact $a$ and close the circuit at the contact $b$. Thus, at this time the input capacitor means 6 and the output capacitor means 7 are electrically connected to each other by way of the above-described oscillating circuit means of the invention. With this oscillating circuit means at the instant when the output capacitor means 7 has been charged up to the digital-value charge corresponding to 1 L.V., UJT 11 will momentarily respond in order to bring about a complete discharge of the output capacitor means 7, with the transistor 10 operating at this time to disconnect the capacitor means 6 from the capacitor means 7, and immediately after the complete discharge of the capacitor means 7, the oscillating circuit means responds to again connect the input capacitor means 6 to the output capacitor means 7 so that the latter again charges up to the digital-value charge, and so on. Thus with the oscillating circuit means of the invention a number of charge-discharge cycles are carried out at the output capacitor means 7 with the latter repeatedly being charged up to the predetermined digital-value charge and then discharged.

Figure 2:
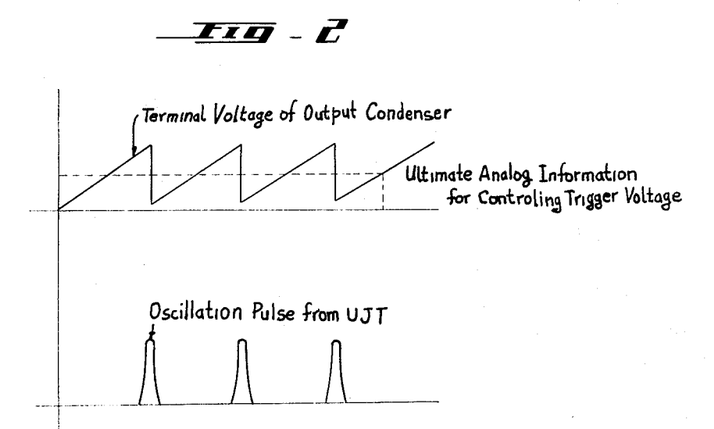
FIG. 2 is a wave diagram illustrating output pulses provided with the information converter of FIG. 1.

The wave-form diagram of FIG. 2 illustrates the oscillating condition between the terminal voltage of the output capacitor means 7 and UJT 11. As is apparent from FIG. 2, the analog-information stored at the capacitor means 6 will reproduce a series of charge-discharge cycles at the capacitor means 7.

During the above operation of the information converter of the invention the charge at the capacitor means 6 will diminish, and finally, in the event that the analog charge initially stored in the capacitor means 6 is not a precise multiple of the digital-value charge to which the capacitor means 7 is repeatedly charged, there will remain at the input capacitor means 6 as well as the output capacitor means 7 a residual analog charge which is less than the digital-value charge. In other words after repeatedly carrying out the above cycles the capacitors 6 and 7 will reach a balanced condition where these capacitors have a residual analog charge which is a fraction of the digital-value charge up to which the capacitor means 7 is repeatedly charged before being discharged at each cycle. Thus, at this time the discharge of input capacitor means 6 will be terminated and the information converter will assume an idle condition. Of course, the charge which is now stored at the output capacitor means 7 is not discharged but is maintained continuously, and in the example of FIG. 1 the terminal voltage of the output capacitor means 7 is now applied directly to the trigger circuit of the electric shutter controls. Thus, the final residual analog charge retained by the output capacitor means 7 will act across the terminals of the trigger resistor 22 in the form of a trigger voltage which is biased by transistor 19 and bias resistor 23.

All of the above operations take place just prior to release of the shutter to make an exposure. The switch 21 will close in order to start the operation of the shutter, and the shutter will open for a predetermined interval and then close automatically in response to operation of the electromagnet 20 in a well known manner. This exposure time is determined by the controlled trigger voltage and the time constant, with the latter being determined in accordance with the selected timing resistor and the timing capacitor 17.

Figure 3:
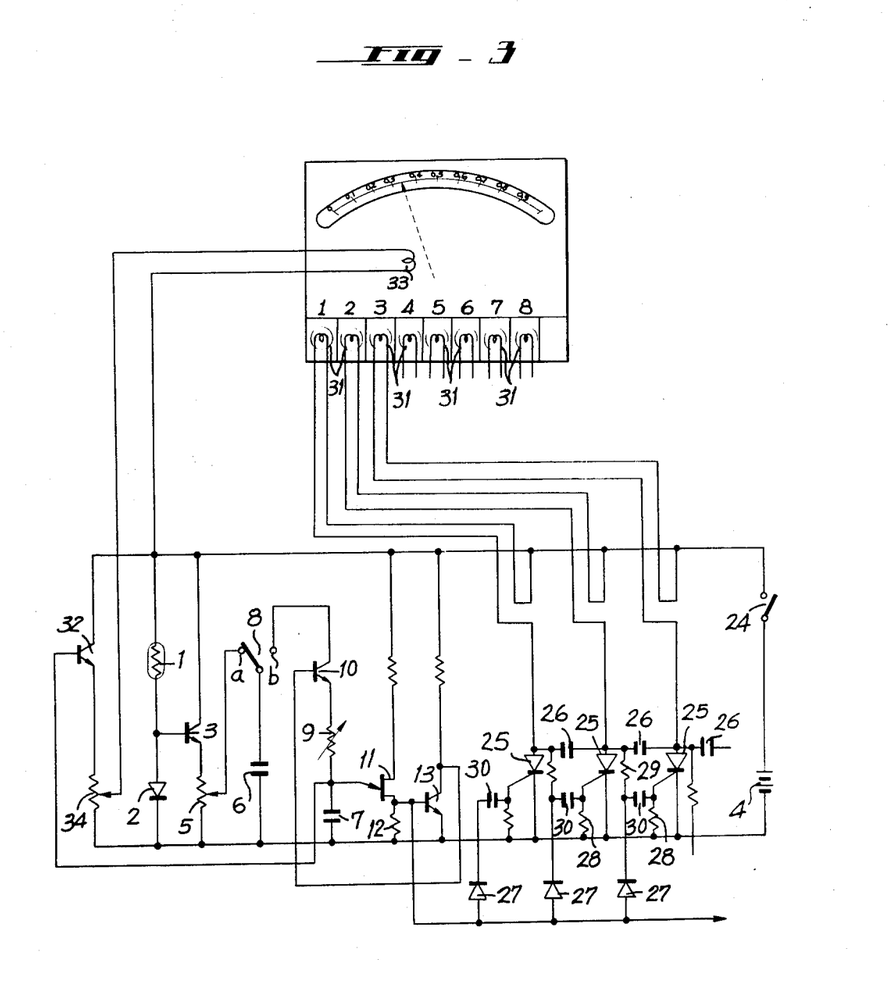
FIG. 3 schematically illustrates the invention as applied to a light meter.

Referring now to FIG.3, there is illustrated therein an embodiment of the invention where the information converter forms part of a light meter. This embodiment of the invention includes an information converter, a pulse counter circuit, and an exposure meter section. The information converter which forms part of the embodiment of FIG.3 is identical with that included in the camera of FIG.1, so that the corresponding components are designated by the same reference characters. These components operate in FIG.3 in precisely the manner described above in connection with FIG.1.

The pulse counter circuit of FIG.3 is made up of a plurality of thyristors 25 which are connected in parallel and bridged across each pair of adjacent anodes by a capacitor 26 so that through this circuitry each stage returns a pulse to the the stage. The several gates of the thyristors 25 are respectively connected with diodes 27 in a forward direction, while tha anodes are all connected to one of the base terminals of UJT of the information converter so as to enable the digital information to be transmitted. Gate resistors 28, actuation-regulating resistors 29, and capacitors 30 are also connected into the circuit as shown in FIG.3. In addition, the meter includes an indicator means for indicating successive light values, and this indicator means includes lamps 31 respectively connected into the anode circuits of the thyristors 25. The circuitry is calibrated in such a way that the several lamps 31 indicate successive light values with the interval from one lamp to the next being equal to 1 L.V.

The circuitry of FIG. 3 includes a transistor 32 which acts to amplify the residual analog charge remaining at the output capacitor means 7 of the information converter after the series of charge-discharge cycles referred to above. The emitter of transistor 32 is coupled with a variable resistor 34 for transmitting the residual analog charge to a moving coil 33 of the meter. This moving coil 33 is situated in the exposure meter section in such a way that it assumes an angular position corresponding to the magnitude of the residual analog charge, and it is connected in a known way with a needle which moves along a scale graduated according to fractions of 1 L.V.

Thus, with this embodiment of the invention the terminal voltage at the output capacitor means 7 appearing when it has been charged up to the predetermined digital value during each operating cycle, or an operating voltage of UJT 11 is set to correspond to a value of 1 L.V. so as to thereby bring about oscillations with an interval corresponding to 1 L.V. Then the photoelectrically converted information according to the light received from the object to be photographed is further converted and developed from UJT 11 in the form of digital values, the first-stage thyristor 25 of the pulse counter circuit will be turned on by the first pulse information, resulting in illumination of the corresponding lamp 31 which is connected into the anode circuit of this first-stage thyristor 25. This lamp will become extinguished upon termination of the first pulse and the second pulse from UJT 11 will act through the second-stage thyristor 25 in order to illuminate the second lamp 31, with the first-stage thyristor being turned off, the second lamp of course being inserted in the anode circuit of the second-stage thyristor 25. In other words, inasmuch as the gate potential of all thyristors 25 except the first are maintained positive, the first-stage thyristor will be turned on by the first pulse of the information converter, thereby lowering the gate voltage of the second-stage thyristor. This permits the second pulse to reach the gate of the second-stage thyristor 25 in order to turn the latter on. At this time the capacitor 26 coupled across the anodes of the first and second thyristors 25 acts momentarily as a counter polar voltage source due to the conductivity of the second-stage thyristor 25, so that the first-stage thyristor 25 is reversed or inverted in order to be turned off.

In this way, the pulse counter circuit operates in response to the photoelectrically converted information from the light received from the object to be photographed to turn on and off the successive exposure-indicating lamps 31 at every increment ocrresponding to 1 L.V., so that the successive lamps 31 which are respectively connected with the successive thyristors are successively turned on during oscillation of the UJT 11.

Thus, after the last complete charge-discharge cycle of the output capacitor means 7 that lamp 31 will remain illuminated which will indicate the number of cycles or number of light values corresponding to the analog information initially stored in the input capacitor means 6. On the other hand, the residual analog charge remaining in the balanced capacitors 6 and 7 is transmitted from the capacitor 7 through the transistor 32 to the moving coil 33 of the exposure means in order to situate this coil at an angular position where the arrow will point to a graduation along the curved scale which indicates the magnitude of the residual analog charge. This scale is relatively large and permits an extremely precise indication of the fractional value remaining after the illumination of the last lamp 31 corresponding to the last light value. Thus it is possible to obtain a reading such as 3.35 L.V., for example, this being the reading shown in FIG. 3 if it is assumed that the third lamp remains illuminated after the charge-discharge cycles have been completed.

In the event that it is necessary to adjust the bias voltage in conformance with the electrical properties of the input capacitor means 6 and the open capacitor means 7, a variable resistor 34 is provided output this purpose.

It is to be noted that the information converter of the invention is applicable not only to shutter controls and exposure meters but also to many other types of electrical apparatus and instruments, particularly instruments and apparatus used for communication purposes. In all such applications it is possible, in accordance with the embodiment shown in FIGS. 1 and 3, to incorporate into the information converter an oscillating circuit means which includes UJT 11, thus achieving a stabilized operation in a simple way. However, it is to be noted that use of UJT 11 is not essential since similar results can be achieved as, for example, by using a bootstrap circuit or a Miller circuit.

With the above-described information converter of the invention the transistor 10 is inserted into the discharge circuit of the input capacitor means 6 in order to momentarily open the discharge circuit so as to prevent charging thereof through UJT 11. However, if the error which is incurred during such discharge can be ignored, then the transistor 10 is not essential and may be replaced with a relay switch or the like so as to prevent possible discharge of the stored information.

Moreover, in the embodiment of FIG. 1 where the information converter of the invention is applied to electrical shutter controls, a fine adjustment of bias voltage can advantageously be achieved by a variable resistor such as the bias resistor 23. In addition, if the characteristics of transistor 19 are suitably selected, this bias resistor may be omitted.

Figure 4:
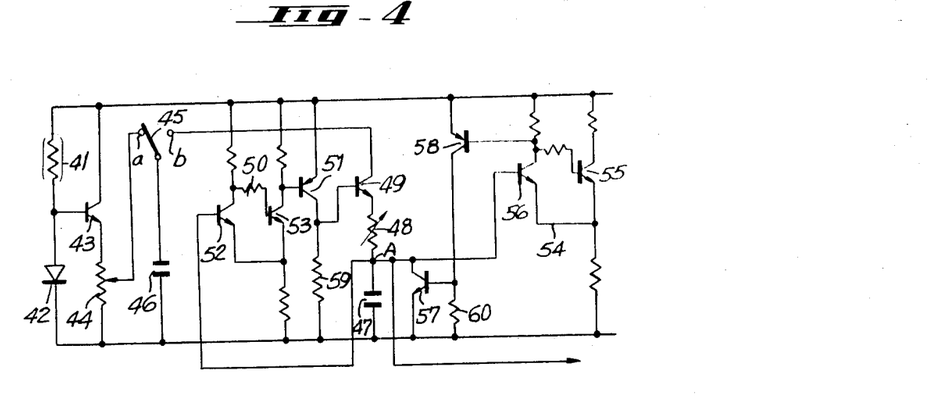
FIGS. 4-6 respectively illustrate three different embodiments of the invention each of which utilizes a Schmitt circuit.
Figure 5:
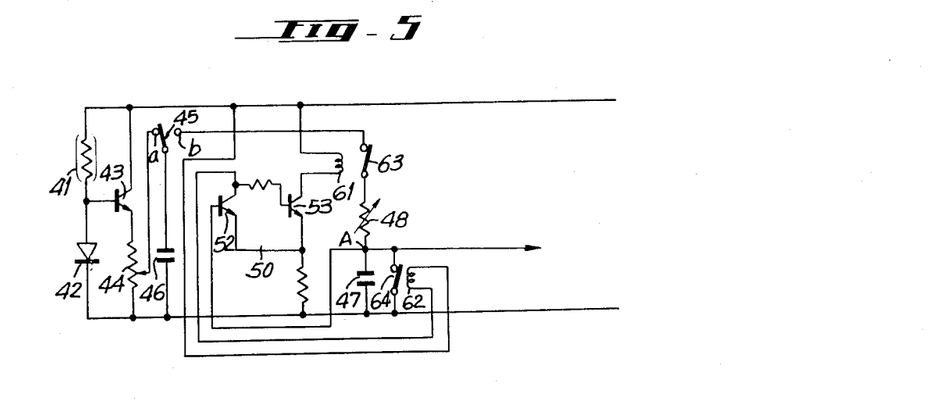
Figure 6:
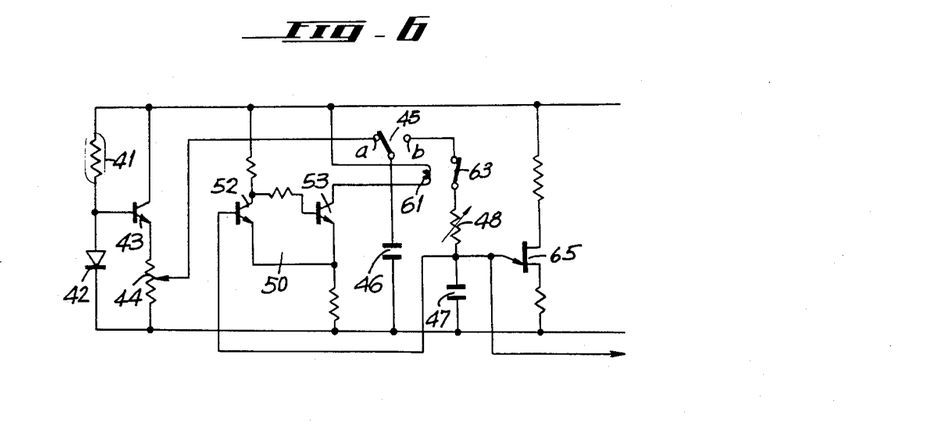

Additional embodiments of the invention are illustrated in FIGS. 4-6. In the embodiments shown in FIGS. 4-6 the information converter of the invention includes a marginal operation circuit. In these embodiments the input capacitor means for storing the analog information also has an output capacitor means inserted in its discharge circuit. Each of the embodiments of FIGS. 4-6 includes at least one Schmitt circuit for triggering the output in accordance with the predetermined digital-value charge to which the output capacitor means is repeatedly charged during the charge-discharge cycles, and these embodiments may also include additional circuit arrangements such as a circuit for temporarily opening the discharge circuit during operation of the Schmitt circuit and a discharge oscillation circuit for continuously discharging the output capacitor means after the latter has been charged to the predetermined digital-value charge.

Referring specifically to FIG. 4, there is illustrated therein an input means which includes the photosensitive light-receiving element 41 which acts as a photoelectric conversion element and which is coupled across the base and collector terminals of the amplifying transistor 43. The logarithmic conversion diode 42 which is connected in series with element 41 is connected across the base and emitter terminals of the transistor 43. Thus, components 41-43 form a photoelectric conversion circuit.

The selecting switch 45 corresponds to the switch 8 described above and is electrically connected with the variable resistor 44 in order to transmit the analog information out of the photoelectric conversion circuit. The input capacitor means 46 is connected to the input means through the switch 45 when the latter is normally closed at its contact $a$. The output capacitor means 47 is connected into the discharge circuit of the input capacitor means 46 when the switch 45 is displaced to open the circuit at the contact $a$ and close the circuit at the contact $b$. The output capacitor means 47 also has a smaller capacitance than the input capacitor means 46.

A variable resistor 48 and a switching transistor 49 are connected in series in the discharge circuit between the capacitors 46 and 47. The switching transistor 49 is controlled by a transistor 51 which in turn is controlled by a Schmitt circuit 50. This Schmitt circuit 50 is made up of a first-stage transistor 52 and a second-stage transistor 53 which are electrically connected in a known manner, the base of the first-stage transistor 52 being connected to the output terminal A of the output capacitor means 47. The transistors 49 and 51 together with the Schmitt circuit 50 form a circuit for opening the charging circuit of the output capacitor means 47.

The oscillating circuit means of FIG. 4 includes also an additional Schmitt circuit 54 having a second-stage transistor 55 and a first-stage transistor 56, the base of a transistor 58 for controlling the switching transistor 57 being connected to the collector of the first-stage transistor 56. The output capacitor means 47 is connected in parallel with the transistor 57 across the collector and emitter thereof. The base of the first-stage transistor 56 of the second Schmitt circuit 54 is connected into the output terminal A of the output capacitor means 47 thereby permitting a trigger voltage to be applied. Thus, the second Schmitt circuit 54 and the transistors 57, 58 form that part of the oscillating circuit means which rapidly discharges the output capacitor means 47 after the latter has been charged up to the digital-value charge, while the first Schmitt circuit 50 together with the transistors 49 and 51 form that part of the oscillating circuit means for interrupting the charging of output capacitor means 47 from input capacitor means 46 while the output capacitor means 47 is discharged. The circuitry illustrated in FIG. 4 includes also bias resistors 59 and 60.

With the embodiment of FIG. 4 the light-receiving component 41 responds to light and the input means starts operating. While switch 45 is in its illustrated normal position the analog information is stored as a charge at the input capacitor means 46. When the switch 45 is displaced so as to engage contact $b$, the discharge circuit between input capacitor means 46 and output capacitor means 47 is closed, and the input capacitor means 46 will now start to discharge in order to store a charge at the output capacitor means 47.

At this time inasmuch as both Schmitt circuits 50 and 51 are in a state where the second-stage transistors 53 and 55 are conducting while the first-stage transistors 52 and 56 are non-conducting, the switching transistor 49 in the discharge circuit will be conductive while the switching transistor 57 will be non-conductive.

Under these operating conditions the output capacitor means 47 is progressively charged to an increasing extent. When the potential at output terminal A has reached the predetermined digital-value charge of the output capacitor means 47, both of the Schmitt circuits 50 and 54 respond so as to switch over in order to place the switching transistor 49 in a blocking condition where it is non-conductive while the switching transistor 57 now becomes conductive. As a result the circuit between capacitors 46 and 47 opens while output capacitor means 47 discharges. Thus the potential at terminal A drops, and both of the Schmitt circuits 50 and 54 are again restored to their initial state, thereby turning transistor 49 on and transistor 57 off. In this way the first cycle ends and the second cycle starts. The capacitor means 46 will now be further discharged, and the charge-discharge cycles will take place successively at the capacitor means 47 in this manner.

Thus, the photoelectrically converted input information is further converted into digital information in the form of a series of pulses each of which has a definite constant level determined by the capacitance of the output capacitor means 47. When the input capacitor means 46 has been almost completely discharged, there will be a condition where the charges at both capacitors 46 and 47 are equal. This latter residual analog charge is less than the digital-value charge up to which capacitor 47 has been repeatedly charged during the previous operating cycles, and thus at this time the potential at the output terminal A is insufficient to form a trigger voltage for the Schmitt circuits 50, 54, so that the potential at output terminal A remains unchanged This potential which is equal to the residual analog charge is then taken from the terminal A to be used in the manner described above in connection with FIG. 1 or in connection with FIG. 3.

The above description refers to an on-off operation of switching transistors 49, 57 which takes place in a synchronous manner. Such operation, however, may cause the photoelectrically converted information to be discharged directly over the switching transistor 57. Therefore, the on-off operation of switching transistors 49, 57 should be shifted in a predetermined timed relation with respect to each other. With the embodiment of FIG. 4 the first Schmitt circuit 50 is set to switch over slightly before the second Schmitt circuit 54 while the restoring operation of the first Schmitt circuit 50 is adjusted so that it is delayed slightly as compared with that of the second Schmitt circuit 54. By setting these Schmitt circuits in this manner the switching transistor 57 will turn off immediately after the pre-determined digital-value charge has been received by the output capacitor means 47 and then the switching transistor 57 will turn on again. On the other hand, upon termination of the discharge of the output capacitor means 47, the switching transistor 57 will first be turned off and then the switching transistor 49 will be turned on. Therefore, the photo-electrically converted information will not be subjected during the discharge operation to any effects which might result in any possible errors.

If the residual analog charge stored at the output capacitor means 47 is applied as a trigger voltage to a timing resistor selecting type of shutter control system, a continuous adjustment of exposure time may be achieved in the manner described above. In other words with such an electric shutter control system an exposure time would ordinarily be determined only by the selected timing resistor and the timing capacitor which has a predetermined capacity, and thus any fractional exposure time which could not be covered by a selected timing resistor is necessarily neglected. If the trigger voltage, therefore, is controlled in accordance with the fractional residual analog charge remaining at the end of the charge-discharge cycles, the adjustment of exposure time will be made very precisely even at points between the increments determined by two adjacent timing resistors. The digital information and the residual analog information achieved with the embodiment of FIG. 4 may also be used with an exposure meter as shown in FIG. 3.

The embodiment of FIG. 5 is similar to that of FIG. 4 except that the second Schmitt circuit 54 is eliminated and the first Schmitt circuit 50 is combined with other structure in order to achieve the desired results. The other features of FIG. 5 are identical with that of FIG. 4 and the corresponding components are designated by the same reference characters.

According to FIG. 5, the oscillating circuit means includes only one Schmitt circuit, namely the Schmitt circuit 50, and a pair of relay means respectively formed by relay coils 61 and 62 and by the switches 63 and 64 which are respectively controlled by the coils 61 and 62. The relay coil 61 is inserted in the collector circuit of the second-stage transistor 53 of Schmitt circuit 50. The relay coil 61 and the relay switch 63 correspond to and performs the same operation as the switching transistor 59 of FIG. 4. On the other hand, the relay coil 62 is inserted into the collector circuit of the first-stage transistor 52 of Schmitt circuit 50, and the relay switch 54 is connected in parallel with the output capacitor means 47. Relay coil 62 and relay switch 64 together replace and correspond to the switching transistor 57 of FIG. 4. Since the relay switches 63, 64 are connected into the circuit in such a way as to carry out mutually reversed operations due to the operating characteristics of Schmitt circuit 50, when the output capacitor means 47 is initially charged up to the digital-value charge, the Schmitt circuit 50 switches over so as to open relay switch 63 and close relay switch 64. When the potential at output terminal A drops, the Schmitt circuit 50 will be restored to its initial condition, thus closing the relay switch 63 and opening the relay switch 64. In this way the structure of FIG. 5 will also carry out with the illustrated oscillating circuit means a series of charge-discharge cycles at the output capacitor means 47 to achieve the above results.

The embodiment of FIG. 6 is similar to that of FIG. 5 except that in FIG. 6 a unijunction transistor 65 replaces the relay coil 62 and its associated switch 64. All of the rest of the circuitry of FIG. 6 corresponds to that of FIG. 5 and the components are designated by the same reference characters. With the embodiment of FIG. 6 when the output capacitor means 47 has been charged up to the predetermined digital-value charge, the unijunction transistor 65 will be set into operation so as to assume an oscillating condition, and in this way the series of charge-discharge cycles will be carried out with the capacitors finally having the residual analog charge as referred to above.

Thus, these embodiments of FIGS. 4–6 have the ability of further converting the photoelectrically converted information and any other analog information into a series of digital information values each having precisely the same constant level, with a residual analog charge remaining at the end of the charge-discharge cycles. The oscillating circuits of FIGS. 4–6 include the illustrated Schmitt circuits which operate as marginal operating circuits in accordance with the digital-value charge up to which the output capacitor means 47 is charged during each charge-discharge cycle. These circuits provide a reliable and sensitive operation as well as a time lag between the operations of the components. This permits the discharge oscillation circuit to carry out an oscillating operation after the discharge circuit between the capacitors 46 and 47 has been opened for discharging the output capacitor means 47 and it then permits the circuit between the capacitor means 46 and 47 to be closed to carry out the next charge-discharge cycle. Therefore, the possibility of any undesirable discharge of input capacitor means 46 during discharge of output capacitor means 47 can be totally avoided and the accuracy of operation is improved by proper adjustment of these circuits.

Figure 7:
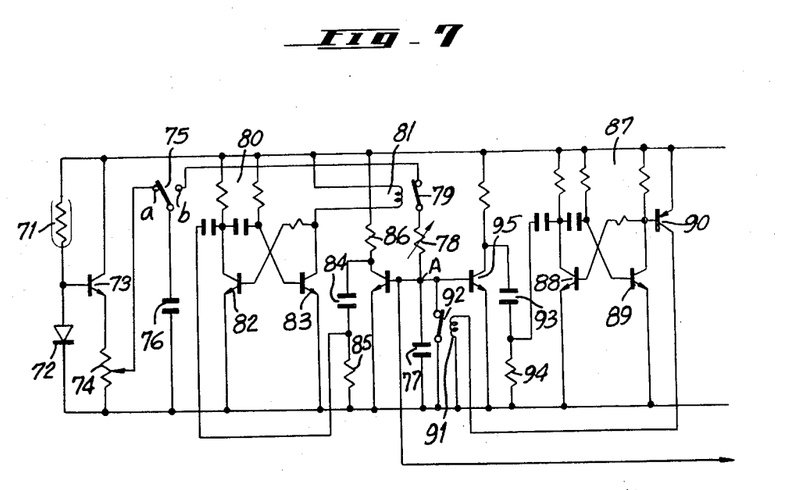
FIGS. 7 and 8 respectively illustrate embodiments of the invention utilizing monostable multivibrators.
Figure 8:
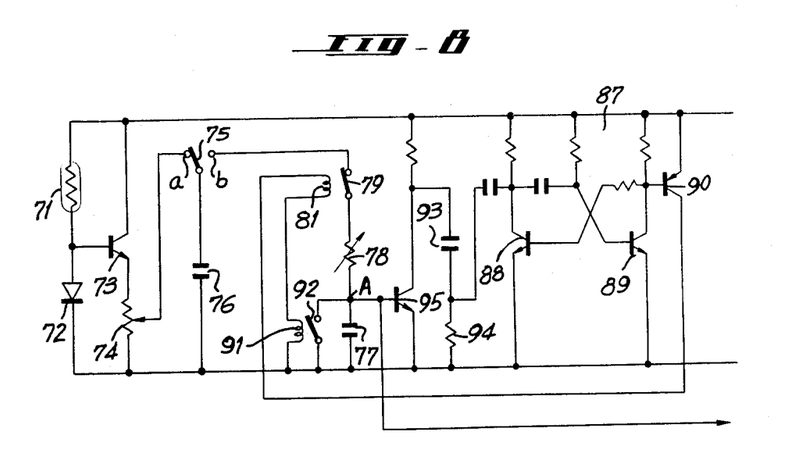

FIGS. 7 and 8 respectively illustrate embodiments of the invention where the oscillating circuit means includes at least one monostable multivibrator. In these embodiments there is also an input capacitor means for storing the analog information as an analog charge and an output capacitor means inserted into the discharge circuit of the input capacitor means. The oscillating circuit means has a differential circuit for shaping the output from the output capacitor means into pulses as well as a monostable multivibrator circuit triggered by the pulses. This oscillating circuit means will bring about the cyclical opening and closing of the discharge circuit between the input and output capacitor means. Thus, the oscillating circuit means will bring about momentary opening of the discharge circuit between the input and output capacitor means while the output capacitor means discharges after having been initially charged up to the digital-value charge, so that with this oscillating circuit means there is also a series of charge-discharge cycles for the output capacitor means. If required, an additional information conversion controlling circuit may be provided to control either the discharge oscillating circuit between the input and output capacitor means or the discharge circuit of the output capacitor means.

Referring now to FIG. 7, the input means includes the photosensitive light-receiving element 71 which operates as a photoelectric conversion element and which is connected across the base and collector terminals of the amplifying transistor 73 to which there is in turn connected the logarithmic conversion diode 72 which is connected across the base and emitter terminals of the transistor 73. Components 71-73 from the photoelectric conversion circuit, as referred to above in connection with the other embodiments.

This embodiment also has a selecting switch 75 electrically connected through the variable resistor 74 to the photoelectric conversion circuit so as to store the analog information in the input capacitor means 76 when the switch 75 is in its normally closed position closing the circuit through the contact a. Connected in parallel with the input capacitor means 76 is the output capacitor means 77 which becomes inserted in the discharge circuit of input capacitor means 76 when the switch 75 is displaced from contact a and engages contact b. Output capacitor means 77 again has a smaller capacitance than the input capacitor means 76.

A variable resistor 78 and a normally closed switch 79 are connected in series in the discharge circuit between the capacitors 76 and 77, this switch 79 forming a relay switch controlled by the relay coil 81 which in turn is controlled by a first monostable multivibrator circuit 80 of the oscillating circuit means. This first multivibrator circuit 80 consists of a first-stage transistor 82 and a second-stage transistor 83 in a well known manner. The collector terminal of the first-stage transistor 82 is coupled to the series-connected junction between capacitor 84 and resistor 85 thus forming a differential circuit to permit trigger pulses to be applied.

A switching transistor 86 is connected to the output terminal A and the output capacitor means 77, and the above differential circuit is connected across the collector and the emitter of the switching transistor 86. Relay 81, the first multivibrator 80, the differential circuit, and switching transistor 86 together form that part of the oscillating circuit means which opens the discharge circuit of input capacitor means 76 when the output capacitor means 77 has been charged up to the predetermined digital-value charge.

The oscillating circuit means of FIG. 7 further includes a second monostable multivibrator circuit 87 made up of a first-stage transistor 88 and a second-stage transistor 89. A switching transistor 90 is connected at its base to the collector of the second-stage transistor 89. In the collector circuit of switching transistor 90 there is a relay coil 91 which controls a normally closed relay switch 92 which is connected in parallel with the output capacitor means 77. The collector of the first-stage transistor 88 in the second multivibrator circuit 87 is connected to the series-connected junction between capacitor 93 and resistor 94 forming in this way a second differential circuit This differential circuit is coupled across the emitter and collector of a switching transistor 95, the base of which is connected to the output terminal A of the output capacitor means 77. Thus, the second multivibrator circuit 87, the switching transistor 90, the relay coil 91 and relay switch 92 form that part of the oscillating circuit means which brings about rapid discharge of the output capacitor means 77 after the latter has been charged up to the predetermined digital-value charge.

With this embodiment, the photoelectric conversion circuit 71-74 operates as the input means for feeding to the input capacitor means 76 the analog-information charge when the switch 75 is in its normal position shown in FIG. 7. Upon subsequent opening of the circuit at contact a and closing of the circuit at contact b, the discharge circuit of capacitor means 76 is closed and the input capacitor means 76 will now start to discharge, so as to charge the output capacitor means 77 up to the digital-value charge. Since both of the multivibrators 80 and 81 are on at their second-stage transistors 83 and 89 and off at their first-stage transistors 82 and 88, with the entire circuitry operating at this time with energy derived from the power source such as a battery, the switch 79 in the discharge circuit between capacitors 76 and 77 is closed so as to turn switching transistor 90 on and thus maintain switch 92 open.

While the charge at the output capacitor means 77 builds up toward the predetermined digital-value charge, these conditions remain, and when the output capacitor means 77 has been charged to the digital-value charge, the switching transistors 86 and 86 and 95 which are set to respond to this digital-value charge will simultaneously turn on, thereby forming discharge circuits for the capacitors 84 and 93 included in the two differential circuits. In this way both of the multivibrators 80 and 87 will be reversed by way of the trigger pulses derived from the differential circuits.

As a result, the second-stage transistor 83 of multivibrator circuit 80 will be turned off so as to restore relay 81 to its normal condition where the switch 79 opens thus opening the discharge circuit of the input capacitor means 76, and this operation takes place simultaneously with the turning off of the second-stage transistor 89 in the second multivibrator 87. This turns transistor 90 off and restores relay 91 to its normal condition where switch 92 closes so as to short circuit the output capacitor means 77. As a result, the discharge circuit of input capacitor means 76 is opened while the output capacitor means 77 which has been charged up to the digital-value charge is rapidly discharged through the second multivibrator 87. Immediately subsequent to discharge of the output capacitor means 77 the multivibrators 80 and 87 are restored to their initial condition thereby opening switch 92 by way of relay 91 after discharge of output capacitor means 77 through the transistor 90 while the latter is in its conductive state. Inasmuch as the second-stage transistor 83 of the first multivibrator circuit 80 is also turned on, the switch 79 controlled by relay 81 is closed, and thus the next charge-discharge cycle will take place. These operations are repeated bringing about the series of pulses determined by the digital-value charge up to which the output capacitor means 77 is repeatedly charged.

After the last of these cycles has been completed there will remain at the input capacitor means 76 a residual analog charge less than that required to bring the output capacitor means 77 up to the digital-value charge, so that the output capacitor means 77 assumes an equal residual analog charge, and the charge at the output terminal A is insufficient to provide the operating voltage required by the switching transistors 86 and 95, and now the potential at output terminal A will remain unchanged. This residual analog charge will then be used in any of the ways described above to bring about the control according to the value between successive digital values.

In the above operation the on-off conditions of relay switches 79 and 92 are always synchronized. However, with such an arrangement there is a danger that the analog charge at the input capacitor means 76 can discharge directly through the switch 92. Therefore, the timing of the switches 79 and 92 is shifted to prevent such an operation.

With the embodiment of FIG. 7 the first multivibrator circuit 80 is arranged so that the forward operation thereof is slightly advanced with respect to the forward operation of the second multivibrator circuit 87, while the return operation of the first multivibrator circuit is slightly delayed with respect to that of the second multivibrator circuit 87. If the operation-initiating voltage of switching transistor 86 is set at a level slightly lower than the switching transistor 95, the reverse operation of the first multivibrator circuit is advanced. By setting the first and second multivibrator circuits 80 and 87 in such a manner, the switch 79 will be opened immediately after the output capacitor means 77 has been charged to the predetermined digital-value charge. This is followed by closing of the switch 92. On the other hand, when the output capacitor means 77 discharges the digital-value charge the switch 92 will open followed by closing of the switch 79. As a result the analog charge at the input capacitor means 76 will not be subject to any influence at all during discharge of the output capacitor means 77, so that any errors which otherwise might occur are avoided.

A continuous adjustment of the exposure time, in the case where the structure is used in a camera, is achieved in a practical way with this structure even with a timing resistor selecting type of electric shutter control by applying the residual analog charge at the output capacitor means 77 as a trigger control voltage for the electric shutter circuit, as referred to in connection with the embodiment of FIG. 1, for example. In other words with this latter type of electric shutter control, although the exposure time is determined by a selected timing resistor and the timing capacitor which has a constant capacity, any fractional exposure time corresponding to a value between two adjacent resistors could not be adjusted without the structure of the invention. The trigger voltage, therefore, is controlled in accordance with the fractional value achieved with the residual analog charge, and thus the adjustment of exposure time is made in a highly precise manner at a value between the increments determined by the timing resistors. In addition, the digital and analog information achieved with the information converter of the invention as shown in FIG. 7 may be used with an exposure meter as shown in FIG. 3.

In the embodiment of FIG. 8 the multivibrator circuit 80 is eliminated and the multivibrator circuit 87 is modified in such a way as to bring about control of the switches 79 and 92 by the multivibrator circuit 87. All other components are the same as that of FIG. 7 and are designated by the same reference characters.

With the embodiment of FIG. 8 the relays 81 and 91 are connected in series. When the second-stage transistor 89 of multivibrator 87 is on, or when the output capacitor means 77 is being charged up to the digital-value charge the switching transistor 90 is on so as to maintain switch 79 closed, and at this time the switch 92 is opened. As described above in connection with FIG. 7 relay 81 includes the normally open switch 79 while relay 91 includes the normally closed switch 92. When the multivibrator circuit 87 senses that the output capacitor means 77 has been charged up to the predetermined digital-value charge, the multivibrator 87 reverses, so that switching transistor 90 becomes nonconductive, thereby bringing about opening of the switch 79 and closing of the switch 92. When the output capacitor means 77 has been discharged the multivibrator circuit 87 will return to its initial state thereby opening the switch 92 and closing the switch 79. In this way the embodiment of FIG. 8 also has an oscillating circuit which brings about the charge-discharge cycles at the output capacitor means 77 as described above. Of course, with this embodiment also, after the last complete charge-discharge cycle there will remain at the capacitor 76 and 77 the residual analog charge which is used in the manner described above.

Thus, with these embodiments the analog information is divided into a series of digital values all of which are equal, and where the analog information is not a precise multiple of the digital value there will be a residual analog information representing a fraction of the digital value. The information conversion controlling circuit controls the discharge oscillation circuit for discharging the predetermined digital value charge and a circuit is provided for opening and closing the discharge circuit of the input capacitor means 76, these circuits forming the oscillating circuit means and having a differential circuit and a monostable multivibrator circuit. In this way it is possible to achieve a reliable and sensitive operation so as to increase the accuracy. Since it is possible to provide a time lag between that part of the operation when the output capacitor means is discharged and that part of the operation when the discharge circuit of the input capacitor means is opened and closed, the discharge of the output capacitor means takes place after the discharge circuit of the input capacitor means has been opened and also the discharge circuit of the input capacitor means is permitted to close after discharge of the output capacitor means in order to carry out the next charge-discharge cycle. As a result the influence of the input capacitor means will have no effect during discharge of the output capacitor means and thus the accuracy of the operation is maintained.

With the embodiments of FIGS. 7 and 8 the discharge of the output capacitor means 77 with the dropping of the terminal voltage thereof has no influence on the input means and the closing and opening of the discharge circuit between the input capacitor means 76 and the output capacitor means 77, with the controls being carried out by the operating conditions of the monostable multivibrator circuitry. Thus, it is possible after one cycle to again charge the output capacitor means during the next cycle after the output capacitor means has been completely discharged, thereby providing a precise operation with the output capacitor means being precisely charged at each cycle up to the digital-value charge and with a precise residual analog charge remaining after completion of the series of charge-discharge cycles.

With the embodiments of FIG. 7 and 8, as described above, switch 79 is a normally open switch which closes when the relay 81 is energized. However, by inserting an additional transistor for reversing polarity it is also possible to arrange the relay 79,81 so that the switch 79 is a normally closed switch with the latter becoming open when the relay 81 is energized.

Figure 9:
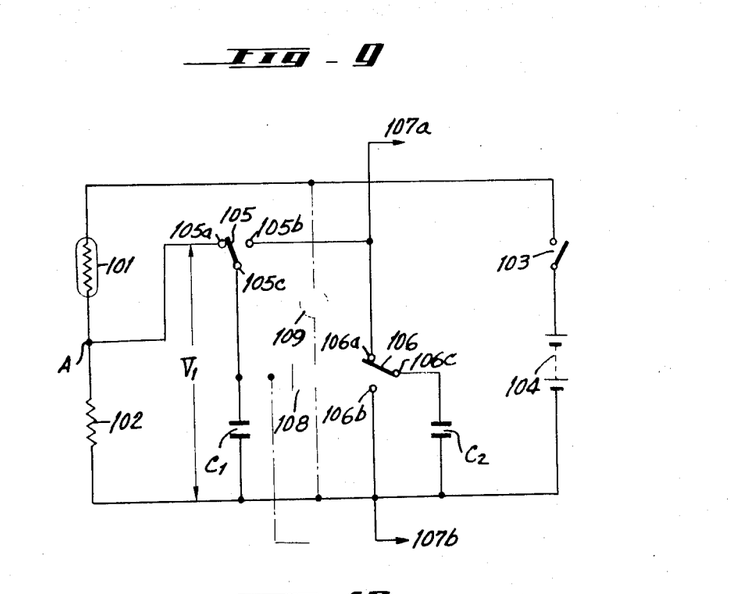
FIG. 9 illustrates an embodiment of the invention where a simple switch arrangement forms an oscillating circuit.
Figure 10:
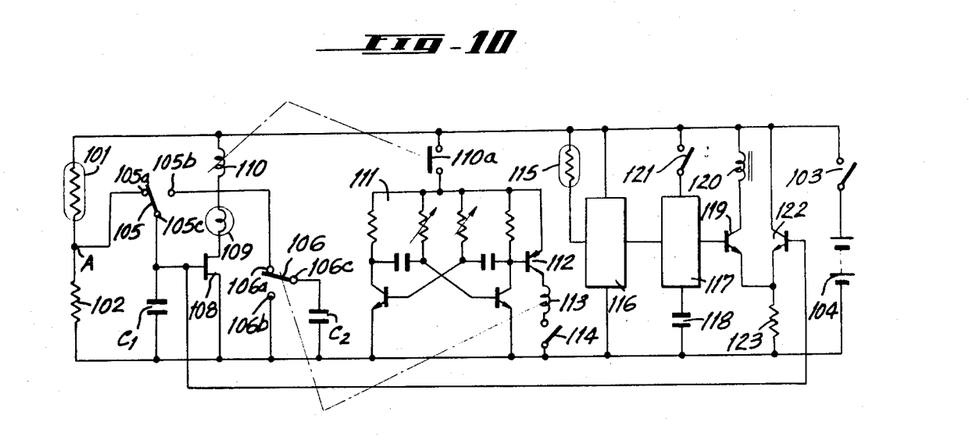
FIG. 10 illustrates a further embodiment of the invention where automatic controls are provided for the switch arrangement of the type shown in FIG. 9.

FIGS. 9 and 10 respectively illustrate embodiments of the invention for use in the further conversion of photoelectrically converted analog information by way of an information converter according to the present invention. In the embodiments of FIGS. 9 and 10 the output capacitor means $C_2$ is inserted into the discharge circuit of the input capacitor means $C_1$ in which the analog information is stored in the form of photoelectrically converted information varying in accordance with a multiple proportion. A second discharge path is newly formed when the first discharge path is forced open by the output capacitor means $C_2$. The capacitances of the capacitor means $C_1$ and $C_2$ are selected in such a way that when $C_1$ and $C_2$ have a relation such as $n = C_2/C_1$ a relation such as $n = 1/(2^\gamma - 1)$ can be satisfied where $\gamma$ is a $\gamma$-value of a light-receiving element contained in the conversion circuit for providing the photoelectrically converted information. The output capacitor means $C_2$ is short-circuited to its associated discharge path when there is a termination of the transfer of the charge between the input and output capacitor means $C_1$ and $C_2$, thereby taking out in this way part of the analog information charged at the input capacitor means $C_1$ during at least one charge-discharge cycle of operation of the output capacitor means $C_2$. These discharges of the output capacitor means $C_2$ of course discharge from the latter the digital-value charges up to which the output capacitor means $C_2$ is repeatedly charged during the charge-discharge cycles. Thus, the repeated discharging of the output capacitor means $C_2$ will result in a reduction in the analog information charge at the input capacitor means $C_2$ according to a multiple proportion in contrast with the photoelectrically converted input information which varies according to the multiple proportion. Even when the embodiments of FIGS. 9 and 10 are used with a timing resistor selecting type of electric shutter control system, a continuous adjustment of exposure time may be achieved by controlling the trigger level of the electric shutter controls with the residual analog charge which varies in a relatively narrow range less than a digital-value charge. This narrow constant range of the digital-value charge may be determined in accordance with the interval between the successive resistances of the timing resistors one of which is selected with the electric shutter controls.

Referring to FIG. 9, the light-receiving element 101 of this embodiment is connected in series with a bleeder resistor 102, and these series-connected components of the input means are in turn connected in series through a power switch 103 to a power source 104. The light-receiving element 101 serves as a photoelectric conversion device and the power source 104 may be a suitable battery. This embodiment also includes a change-over switch 105 having the normal position where the circuit is closed at the contact 105a which is electrically connected to the junction A between the components 101 and 102. An input capacitor means $C_1$ is connected to the common terminal 105c of the change-over switch 105 and through this switch the input capacitor means $C_1$ is normally connected in parallel with the bleeder resistor 102.

The normally open terminal 105b of the change-over switch 105 is electrically connected to a normally closed terminal 106a of a charge-and-discharge switch 106 which forms the oscillating circuit means of this embodiment. The output capacitor means $C_2$ is a splitting capacitor connected to the common terminal 106c of the charge-discharge switch 106 so that through the latter switch the splitting capacitor $C_2$ can be situated in the discharge circuit of the input capacitor means $C_1$ when the switch 105 engages the contact 105b. At this time the switch 106 is in its normal position shown in FIG. 9 closing the discharge circuit between the capacitors $C_1$ and $C_2$ through the contact 106a. The charge-discharge switch 106 has a normally open contact 106b which can be engaged by the movable switch element to close the discharge circuit of the output capacitor means $C_2$ so as to form in this way a discharge circuit for the splitting capacitor $C_2$. FIG. 9 illustrates terminals 107a and 107b for transmitting signals.

Assuming that the switch 103 is closed so that the circuit is energized, then the light-receiving element 101 will receive the light from the object to be photographed and develops photoelectrically developed information which corresponds to the light which is received. As a result the potential at junction A of the bleeder resistor 102 rises in a multiple proportional manner to a level determined by the intensity of the light which is received. Therefore, the quantity of information stored in the input capacitor means $C_1$, which is connected normally in parallel with the bleeder resistor 102, is determined by the potential at junction A, and in this way the input capacitor means receives the analog charge. After the input capacitor means $C_1$ has been fully charged in this way, the change-over switch 105 is operated to open the switch at contact 105a and close the switch at contact 105b, thus closing the discharge circuit of the input capacitor means $C_1$. At this time the charge-discharge switch 106 is in its normal position shown in FIG. 9, so that charging of the output capacitor means $C_2$ takes place during discharge of the analog charge from the input capacitor means $C_1$. When the splitting capacitor $C_2$ has been charged up to the predetermined digital-value charge, the charging operation terminates and thus the discharge of input capacitor means $C_1$ is interrupted so that the capacitors $C_1$ and $C_2$ assume a balanced series-connected condition. At this time the charge-discharge switch 106 is displaced to move away from contact 106a and close the discharge circuit of the splitting capacitor $C_2$ at the contact 106b, so that in this way a discharge circuit for the splitting capacitor $C_2$ is formed and now the splitting or output capacitor means $C_2$ will discharge. Upon return of the switch 106 to its normal position, the splitting capacitor will again be charged with the analog charge from the input capacitor means $C_1$ in the manner described above, thus bringing about a second operating cycle with a new balanced state of capacitors $C_1$ and $C_2$ resulting after the next charging of the output capacitor means $C_2$ up to the digital-value charge. Now the charge-discharge switch 106 will be switched over to complete the discharge circuit of the splitting capacitor $C_2$ and in this way the circuitry will operate to bring about the charge-discharge cycles of the output capacitor means $C_2$.

These repeated cycles will reduce in a stepwise manner the analog charge at the input capacitor means $C_1$, so that the digital values determined by the balanced condition of the capacitors $C_1$ and $C_2$ will result in intermittent reduction of the analog charge at the input capacitor means $C_1$, and these digital-value charges will appear across the output terminals 107a and 107b. Since the resulting digital information has been achieved under conditions determined by the capacitances of the input capacitor means $C_1$ and the splitting capacitor $C_2$, they do not necessarily vary in accordance with a multiple proportion in contrast to the photoelectrically converted input information which varies in accordance with a multiple proportion. The light-receiving element 101, the input capacitor means $C_1$ and the output or splitting capacitor means $C_2$ therefore are constructed so as to have a certain inter-relationship so as to thereby impart to the resulting digital information a characteristic corresponding to the photoelectrically converted input information which varies according to a multiple proportion.

Assuming that the terminal voltage of the memory condenser $C_1$ is $V_1$ and the discharge current, which will flow when the splitting condenser $C_2$ is inserted in the discharge path of the memory condenser $C_1$, is $i$, the transient current which flows upon shorting the change-over switch 105 to the normally opened terminal 105b will be expressed by the following equation:

$$(1/C_1) \int i\,dt + (1/C_2) \int i\,dt = 0$$

This equation may be transformed according to the Laplace's transformation, to give $$1/C_1[(I(s)/S) + 1/S \int i(0)dt\,] + 1/C_2[(I(s)/S) + 1/S \int i(0)dt] = 0$$

$$1/C_1[(I(s)/S) + C_1V_1/S] + (I(s)/SC_2) = 0$$

$$I(s) = -\frac{\dfrac{V_1}{S}}{\dfrac{1}{SC_1}+\dfrac{1}{SC_2}}$$

Thus, when $t \to \infty$, or when $C_1$ and $C_2$ are balanced, the terminal voltage $V_2$ of the splitting condenser $C_2$ will be $$V_2(s) = I(s) \cdot 1/SC_2$$

$$= -\frac{\dfrac{V_1}{S}}{\dfrac{1}{SC_1}+\dfrac{1}{SC_2}} \cdot \frac{1}{SC_2}$$

$$= -\frac{1}{S} \cdot \frac{C_1}{C_1+C_2} \cdot V_1$$

$$V_2 = \zeta^{-1}(V_2(s)) = -[C_1/(C_1+C_2)] \cdot V_1 \quad (1)$$

(In the above equations, the sign "−" represents that $V_2$ and $V_1$ are in opposite porality with each other.) Assume that $C_1 = nC_2$, $n = C_1/C_2$, equation (1) will be transformed as $$V_2 = nC_2(nC_2 + C_2 \cdot V_1 = n/(n+1)\,V_1$$

(2)

Furthermore, if $n/(n+1)$ is to be expressed by $m$, equation (1) will be transformed as $$V_2 = m.V_1$$

(3)

More concretely, if the condensers $C_1$ and $C_2$ have an equal capacity, $m$ will duly be unity. Thus $$V_2 = \tfrac{1}{2}\,V_1$$

On the other hand, if $C_1 \neq C_2$ and $n = 1, 2, 3, 4, \ldots, k$, $m$ will be ½, ⅔, ¾, 4/5, ..., $k/(k+1)$.

Since $m$ can be regarded as a common ratio of a geometrical proportion decreasing progressively, $m$ will be called a reduction ratio in this description. The reduction ratio means that the balanced voltage $V_2$ of $C_1$ and $C_2$ will necessarily be smaller as compared with $V_1$.

Now a photoelectric conversion circuit consisting of a light-receiving element 101 and a bleeder resistor 102 will be described. As is known, the potential at the connecting terminal A in FIG. 9, or the terminal voltage $V_R$ of the bleeder resistor 102 will be expressed as $$V_R = r/(R+r)\,E$$

where
  $R$ = light-corresponding resistance of the light-receiving element 101,
  $r$ = resistance of the bleeder resistor 102,
  $E$ = power voltage In the region where $V_R$ and $R$ are in a linear relationship with each other, there will be a relation as $R > r$, thus $$VR \doteq r/R\,E \doteq RE \cdot R^{-1}$$

If the resistance of the light-receiving element 101, when it receives no light, is to be expressed by $R_o$ $$R = R_o\,2^{-b\gamma}$$

where
  $b = a$ value corresponding to a specific L.V.
  $\gamma = \gamma$ -value of the light-receiving element 101
Therefore $$VR \doteqdot rE(R_o 2^{-b\gamma})-1 \doteqdot (rE/R_o) 2^{b\gamma} \quad (4)$$

This is a geometric proportion varying as $2^{b\gamma}, 2^{(b+1)\gamma}, 2^{(b+2)\gamma}, \ldots$ The common ratio $p$ of the geometric proportion is $$P = 2^{(b+1)\gamma}/2^{b\gamma} = 2^{(b+2)\gamma}/2^{(b+1)\gamma} = \ldots = 2\gamma$$

This is a common ratio of a diverging geometric proportion and, accordingly is called magnifying ratio. It will be understood from the above description that converted output information corresponding to the photoelectrically converted information can be obtained by determining $n$ or the ratio of $C_1$ to $C_2$, and the $\gamma$-value of the light-receiving element 101 so that a relation such as $m \times p = 1$ can be satisfied. In other words, $n$ and $\gamma$ should be so selected that they have the following relationship:

$$n/(n+1) \times 2^\gamma = 1 \; n2^\gamma = n+1 \; n(2^\gamma - 2 \; 1) = 1 \; n = 1/(2^\gamma - 1) \ldots \quad (5)$$

From equation (5) it is apparent that if $\gamma$ is so selected that $\gamma = 1$, the value of $n$ will be $n = 1$. Therefore, two capacitors having equal capacitance can be used as the input capacitor means $C_1$ and the splitting or output capacitor means $C_2$. Generally when a $\gamma$-value is given, the relationship between $C_1$ and $C_2$ will be duly determined. This is convenient because $C_1$ and $C_2$ need not be so selected that they have an integer ratio therebetween. It is only seldom that one encounters in practice the case where $\gamma$-values commonly used in production are integers. Moreover, in view of the fact that the smaller $\gamma$-value is capable of covering a wide range of light, it is preferred to select a light-receiving element having a smaller $\gamma$-value. As described by selecting $\gamma$ and $n$ which have a relation such as $n = 1/(2^\gamma - 1)$, it will be possible to impart a multiple proportion characteristic as shown by the photoelectrically converted input information to the digital information taken out at the output terminals 107a, 107b. In other words, the photoelectrically converted input information are multiple proportionally increasing analog values, while the further converted output information are multiple proportionally decreasing digital values.

FIG. 10 shows an embodiment where the information converter of the invention is applied to a timing resistor selecting type of electric shutter control system in order to provide a continuous adjustment of the exposure time. The information converter shown in FIG. 10 is the same as that of FIG. 9 and the corresponding components are designated by the same reference characters. An FET (field effect transistor) 108 is connected at its drain in series with an indicating lamp and an electromagnetic relay 110. As is known, FET 108 is a high input impedance transistor having a leakage current which for practical purposes can be ignored. The starting voltage of FET 108 is set in accordance with the resistance interval defined by the timing resistors which are used to determine the exposure value of the shutter controls. For example if the timing resistors are arranged at intervals corresponding to 1 L.V., the starting voltage of FET 108 should be set to 1 L.V. so that FET 108 starts operation when the input capacitor means $C_1$ has been charged to a potential corresponding to 1 L.V. Thus, the indicating lamp 109 and electromagnetic relay 110 will be kept operating until the operating voltage drops below the starting voltage. A switch 110a which operates in response to the electromagnetic relay 110 is arranged in such a way that it serves as a power-supplying switch for a known astable multivibrator circuit 111 which forms with the switch 106 part of the oscillating circuit means of FIG. 10. A transistor 112 is coupled in such a way that it turns on in response to oscillating information from the multivibrator circuit 111. The collector of transistor 112 is connected in series with a second electromagnetic relay 113 and its associated switch 114. The electromagnetic relay 113 is provided for automatically operating the charge-discharge switch 106.

A second light-receiving element 105 is arranged in the electric shutter control circuit in such a way that the photoelectrically converted information produced thereby is applied to a selection signal circuit 116 which transmits a signal for selecting a given timing resistor in the timing resistor selection circuit 117 which consists of a set of timing resistors. The timing resistor which is selected forms a delay circuit together with the timing capacitor 118. In response to the time constant determined by the delay circuit a switching transistor 119 is turned on so as to control the electromagnet 120 which determines when the exposure will be terminated. A shutter release switch 121 operates in synchronism with actuation of the shutter-tripping button to be closed for starting the exposure. A trigger control circuit is formed by way of a transistor 122 which is connected at its emitter to a trigger resistor 123 and at its base, together with the gate of FET 108, to the positive terminal of the input capacitor means $C_1$ so as to control in this way transistor 122 with the residual analog charge across the input capacitor means $C_1$ for varying the trigger voltage.

When the power source switch 103 is closed in the initial stage of the shutter-releasing operation, the input capacitor means $C_1$ will store therein the multiple proportionally varying photoelectrically converted information resulting in illumination of indication lamp 109 and operation of the electromagnetic relay 110. As a result the switch 110a is closed and the multivibrator circuit 111 will start oscillating. Upon change-over of the switch 105 from closing the input to the capacitor means $C_1$ by way of the contact 105a to closing the discharge circuit of capacitor means $C_1$ by way of the contact 105b, as well as by closing of the switch 114, transistor 112 is placed in a continuous on-and-off operation. The charge-discharge switch 106 will accordingly make a change-over operation alternately between the normal closed terminal 106a and the normally open terminal 106b. Therefore, the analog charge in the input capacitor means $C_1$ will be reduced through increments, as described in connection with FIG. 9, or in other words the stored information will be reduced according to a multiple proportion. When the information stored as an analog charge at the input capacitor means $C_1$ decreases in this manner to a value corresponding to 1 L.V., FET 108 becomes inoperative, so that the indicating lamp 109 becomes unenergized, and electromagnetic relay 110 is restored to its initial condition. Therefore, the multivibrator 111 stops operating, the transistor 112 and the electromagnetic relay 113 are restored to their initial condition, while the charge-discharge switch 106 assumes its normal position engaging contact 106a. Inasmuch as input capacitor means $C_1$ and the splitting or output capacitor means $C_2$ are balanced in this condition, the input capacitor means will not discharge and the terminal voltage across the input capacitor means $C_1$ will remain unchanged.

On the other hand, inasmuch as the residual analog charge remaining at the input capacitor means $C_1$ is applied as a base voltage to the transistor 122, the conditions which will determine the adjustment of the exposure time will be determined upon closing the shutter-release switch 121, by way of the trigger-control voltage developed by the transistor 122 as well as by the time constant which in turn is determined by the selected timing resistor of the circuit 117 and the timing capacitor 118. In other words a fractional part of the light received from the object to be photographed, or a portion of this light which cannot be covered by a selected timing resistor is covered by the trigger voltage controlled by the information converted with the information converter of the invention, thereby achieving a continuous adjustment of exposure time consistently with the light received from the object to be photographed.

As has been proved above, as long as the condition $n = 1/(2^\gamma - 1)$ is satisfied, input capacitor means $C_1$ and the splitting capacitor $C_2$ store therein an equal quantity of information in their balanced condition. Assuming now that the starting voltage of FET 108 is 0.1V and the potential of the photoelectrically converted information is 3.2V, the balanced voltage between the capacitors $C_1$ and $C_2$ will drop in increments as follows:

3.2V, 1.6V, 0.8V, 0.4V, 0.2V, 0.1V, 0.5V

When the balanced voltage is 0.1V, FET 108 will be operating. Thus, the indicating lamp 109 and electromagnetic relay 110 will still be operating. When the charge-discharge switch 106 makes the next switching operation, the balanced voltage will drop to 0.05V to thereby render FET 108 inoperative. Now indicating lamp 109 will be turned off, electromagnetic relay 110 will be restored to its initial condition, and the balanced voltage 0.05V will be applied to the trigger circuit of the electric shutter controls.

In the same way, if the potential of the photoelectrically converted is 0.7V, the resulting balanced voltage will be as follows:

0.7V, 0.35V, 0.175V, 0.0875V

Thus, the ultimate balanced voltage will be 0.0875V, and this is the residual analog charge which will be applied to the trigger circuit as a control voltage therefor. In this embodiment the charge-discharge switch 106 is arranged in such a way as to be automatically switched over by means of the multivibrator circuit 111, but the above-referred to residual analog voltage may also be obtained by a manual operation of the charge-discharge switch 106 if FET 108 and indicating lamp 109 are arranged in the manner indicated by the dot-dash lines in FIG. 9. In this case extinguishing of the indication lamp 109 indicates that the trigger voltage has been reached.

As is apparent from the above description when with the embodiment of FIGS. 9 and 10 the light-receiving element and capacitors $C_1$ and $C_2$ are set in such a way that there exists the relationship $n = 1/(2^\gamma - 1)$, it is capable of converting the photoelectrically converted and multiple proportionally varying input analog information into digital output information which reduce accordingly the multiple proportion. Thus a continuous adjustment of exposure time can be made with a timing resistor selecting type of electrical shutter device by selecting given digital information as a reference information corresponding to the lighting condition which in turn corresponds to an interval between the timing resistors and by controlling the trigger circuit with the residual analog charge which is less than the reference value. As is clearly understood from the relation $n = 1/(2^\gamma - 1)$, the light-receiving element may be used in a lower region of $\gamma$-value. This permits providing an electrical shutter control with an excellent response characteristic over a wide range of light intensity. In addition, the lack of uniformity of $\gamma$-value provided by the light-receiving element as available on the market can be compensated by selecting capacitors having suitable capacitances.

The information converters according to the present invention may be also constructed for manual operation. This is advantageous in order to simplify the construction of the information converter. In addition the information converters of the embodiments of the present invention are of practical value when applied to electric exposure meters.

In summary, the present invention provides information converters which have the ability to convert photoelectrically converted information of light received from the object to be photographed or other analog information into continuous digital output information in the form of a series of pulses all having equal constant levels and in the form of an ultimate output residual analog charge, with the period of the digital information being optionally adjusted by means, for example, of a variable resistor. Furthermore, the present invention may be advantageously applied to a timing resistor selecting type of electric shutter control as a trigger voltage control means. More specifically, since the trigger voltage of this type of electic shutter control can be controlled by the residual analog charge, which can be obtained by further converting the electrically converted information of light received from the object to be photographed, the unsatisfactory step or increment type of adjustment of exposure time by a selected timing resistor and the timing capacitor can be supplemented to achieve a continuous adjustment of exposure time. The information converter of the invention may be made as a separate device which is independent of the electric shutter control device.

Furthermore, when the information converter according to the invention is applied to an electric exposure meter, the exposure value can be indicated at equal intervals by means of the digital output from the information converter while the fractional fine indication of exposure value can be obtained by means of the residual analog charge developed by the information converter. In this case the fractional fine indication can be made by use of the needle connected to the moving coil to achieve an enlarged indication of the fine, fractional analog charge.

It is to be noted, however, that the present invention is not limited to application to electric shutter devices and electric exposure meters and is also applicable to any communication apparatus and many other devices.

What is claimed is:

1. In an information converter, input capacitor means for storing an analog-information charge, input means electrically connected with said input capacitor means for charging the latter to an extent determined by the analog information, output capacitor means having a capacitance less than said input capacitor means, oscillating circuit means electrically connected with both of said capacitor means for carrying out a number of charge discharge cycles during which said output capacitor means is charged from the analog-information charge stored by said input capacitor means up to a predetermined digital-value charge, then discharged, then again charged from said input capacitor means up to said digital-value charge, and so on until, in the event that said analog-information charge is not a precise multiple of said digital-value charge, both of said capacitor means assume a balanced condition where they respectively have equal residual analog charges each of which is less than said digital-value charge, and detecting means electrically connected with at least one of said capacitor means for detecting said residual analog charge, so that a value corresponding to the number of digital-value charges plus said residual analog charge will correspond precisely to said analog information.

2. The combination of claim 1 and wherein said input means is electrically connected with said input capacitor means for charging the latter with an analog-information charge corresponding to the light at an object which is to be photographed.

3. The combination of claim 2 and wherein a shutter-control means of a camera is electrically connected with said detecting means to be triggered at least in part in accordance with said residual analog charge for determining film exposure.

4. The combination of claim 3 and wherein a photosensitive means is electricaly connected with said shutter-control means for controlling the latter in a stepwise manner according to the number of times said output capacitor means is charged up to said digital-value charge.

5. The combination of claim 2 and wherein said detecting means is a moving coil means of a light meter for indicating said residual analog charge as a fractional light value, said light meter having an indicating means operatively connected with said oscillating circuit means for indicating a light value corresponding to the number of charge-discharge cycles carried out by said oscillating circuit means.

6. The combination of claim 1 and wherein said oscillating circuit means includes unijunction transistor.

7. The combination of claim 1 and wherein said oscillating circuit means includes at least one Schmitt circuit.

8. The combination of claim 7 and wherein said oscillating circuit means includes a pair of Schmitt circuits.

9. The combination of claim 7 and wherein said oscillating circuit means includes a single Schmitt circuit and a pair of relay means electrically connected therewith and with said input and output capacitor means for providing said charge-discharge cycles.

10. The combination of claim 7 and wherein said oscillating circuit means includes a single Schmitt circuit and a relay means and unijunction transistor means electrically connected therewith and with said input and output capacitor means for carrying out said charge-discharge cycles.

11. The combination of claim 1 and wherein said oscillating circuit means includes at least one monostable multivibrator circuit means.

12. The combination of claim 10 and wherein said oscillating circuit means includes a pair of monostable multivibrator circuit means.

13. The combination of claim 11 and wherein said oscillating circuit means includes a single monostable multivibrator circuit means and a pair of relay means controlled thereby and operatively connected with said input and output capacitor means for carrying out said charge-discharge cycles.

14. The combination of claim 1 and wherein said oscillating circuit means includes a charge-discharge switch means having a charging position connecting said input capacitor means to said output capacitor means for charging the latter up to said digital-value charge during each of said cycles and a discharge position for disconnecting said output capacitor means from said input capacitor means and for discharging said output capacitor means during each of said cycles.

15. The combination of claim 14 and wherein said oscillating circuit means includes an astable multivibrator means operatively connected with said charge-discharge switch means for automatically moving the latter between said positions thereof.

* * * * *